Patented Feb. 20, 1934

1,947,944

UNITED STATES PATENT OFFICE 1,947,944

N-ALKYLATED DERIVATIVES OF BARBITURIC ACID

Walter Kropp and Ludwig Taub, Wuppertal-Elberfeld, Germany, assignors to Winthrop Chemical Company, Inc., New York, N. Y., a corporation of New York No Drawing. Application May 12, 1932, Serial No. 610,982, and in Germany May 16, 1931

7 Claims. (Cl. 260—33)

The present invention relates to new N-alkylated derivatives of the barbituric acid series or salts thereof of the probable formula

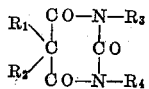

wherein $R_1$ is a cyclo-alkenyl group, for instance, cyclohexenyl or cyclopentenyl, $R_2$ and $R_3$ stand for alkyl or alkenyl radicals, such as allyl, crotyl, etc., $R_4$ is hydrogen, alkyl, alkenyl or a metal, such as sodium, potassium, lithium or calcium. The new products are valuable hypnotics which possess a better taste than the corresponding non-N-alkylated compounds and furthermore a speedy sleep-inducing action.

The new compounds are generally tasteless, whitish, crystalline products, being difficultly soluble in cold water and soluble in hot alcohol. The products in which only one nitrogen atom is alkylated form salts and are therefore easily soluble in a sodium hydroxide solution.

The manufacture of the new N-mono- or -dialkylated C-cyclohexenyl- or C-cyclopentenyl-C-alkylbarbituric acids takes place in accordance with the methods customary for the manufacture of substitution products of barbituric acid. For example, C-cyclohexenyl- or C-cyclopentenyl-C-alkylmalonic acids or -cyanoacetic acids or derivatives thereof, such as for example esters, amides, amide-acid esters, chlorides, nitriles and the like can be condensed by the customary methods with alkylureas to yield N-mono- or -dialkylated C-cyclohexenyl- or C-cyclopentenyl-C-alkylbarbituric acids, which if desired or required can be converted into salts thereof. Instead of alkylureas, urea derivatives, such as for example, N-alkylated guanidines, thioureas, isourea ethers can be employed for the condensation and the resulting intermediate products converted into N-alkylated C-cyclohexenyl- or C-cyclopentenyl-C-alkylbarbituric acids.

Conversely the process can be carried out by starting from barbituric acid itself or substitution products of barbituric acid, which already contain one or more of the required substituents and introducing by the customary methods the substituents still required. In the latter case instead of barbituric acid or substitution products thereof derivatives of barbituric acid can likewise be employed when the first formed intermediate products are converted in the customary manner into N-mono- or -dialkylated C-cyclohexenyl- or C-cyclopentenyl-C-alkylbarbituric acids.

The salts of the new barbituric acid derivatives can be obtained in accordance with the customary methods by the action of the corresponding bases.

The invention is further illustrated by the following examples without being restricted thereto:

Example 1

12.5 parts by weight of sodium are dissolved in 300 parts by weight of absolute alcohol and 40 parts by weight of mono-methylurea and 50 parts by weight of the ethylester of Δ-1:2-cyclohexenyl-methyl-cyanoacetic acid are added to this solution. After boiling for 6–8 hours the alcohol is removed by distillation in vacuo. The residue is boiled for 6–8 hours with about the tenfold quantity of 20% sulfuric acid. After cooling and filtering the new C.C-Δ-1:2-cyclohexenyl-methyl-N-methyl-barbituric acid having the formula:

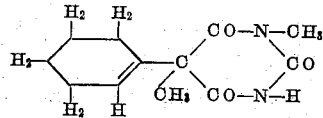

is crystallized from ethyl acetate. It melts at 146° C. and yields readily soluble salts, for example, with sodium and lithium. The calcium salt can likewise be employed for injection purposes. The new compound is completely tasteless.

Instead of ethyl alcohol other alcohols, for example, methyl alcohol can be employed for the condensation.

In an analogous manner by employing starting materials containing other saturated or unsaturated alkyl radicals the corresponding derivatives of Δ-1:2-cyclohexenyl-barbituric acid are produced, for example, the C-methyl-N-ethyl compound (melting point 134–135° C. when crystallized from ethyl acetate or cyclohexane), the C-methyl-N-allyl compound (melting point 127–128° C. when crystallized from ethyl acetate), the C-allyl-N.N'-dimethyl compound (melting point 59–60° C. when crystallized from ligroin) or the C-allyl-N.N'-diallyl compound (boiling point 158–160° C. under a pressure of 1 mm.).

In a similar manner C-methyl-C-(4-methyl-Δ-1:2-cyclohexenyl) - N - methylbarbituric acid can be produced, which after crystallizing from alcohol melts at 133–134° C. and C-(4-methyl-Δ-1:2-cyclohexenyl) - C-ethyl -N- methylbarbituric acid, which after crystallizing from alcohol melts at 119° C.

In a corresponding manner the following derivatives of C-cyclopentenylbarbituric acid were produced:—

C - ethyl -C-(Δ-1:2-cyclopentenyl)-N- methylbarbituric acid, melting at 127–128° C. (crystallizes from alcohol, soluble in benzene, insoluble in petroleum ether), C-methyl-C-(methyl-Δ-1:2-cyclopentenyl)-N-methylbarbituric acid, melting at 116° C. after crystallizing from alcohol, soluble in benzene and soluble with difficulty in petroleum ether, C-ethyl -C- (methyl -Δ-1:2- cyclopentenyl)-N-methylbarbituric acid, melting at 73–74° C. and precipitated from solution in benzene by means of petroleum ether.

Example 2

5.5 parts by weight of sodium are dissolved in 150 parts by weight of absolute alcohol, 15 parts by weight of methylurea and 25 parts by weight of Δ-2:3-cyclohexenyl-methyl-malonic acid ester are added whereupon the mixture is boiled for 8 hours. After cooling, acidifying, diluting with water and extracting with ether the ethereal extract is first shaken with sodium bicarbonate solution, then with normal caustic soda lye. The normal caustic soda lye is acidified and the C.C-Δ-2:3- cyclohexenyl-methyl -N- methylbarbituric acid, which separates, is purified by dissolving in benzene. It dissolves in ether although not very readily. When obtained from its solution in ethylacetate it melts at 127° C.

In a corresponding manner by condensing Δ-2:3-cyclopentenyl-allylmalonic acid ester with methylurea C.C-(Δ-2:3-cyclopentenyl)-allyl-N-methylbarbituric acid can be obtained. After crystallizing from benzene and petroleum ether colorless needles are obtained, melting at 98° C.

Example 3

236 parts by weight of C.C-Δ-1:2-cyclohexenyl-ethyl-barbituric acid are dissolved in 3000 parts by weight of cold normal caustic soda lye and 125 parts by weight of dimethyl sulfate are added with brisk stirring. As soon as the dimethyl sulfate disappears, that is to say, when a clear solution is obtained, dilute sulfuric acid is added until an acid reaction prevails, the C.C-Δ-1:2-cyclohexenyl - ethyl - N - methylbarbituric acid, which separates, is filtered by suction and washed until neutral. When obtained from alcohol it melts at 111–112° C.

By causing twice the quantity of dimethylsulfate to act on C.C-Δ-1:2-cyclohexenyl-ethyl-barbituric acid, C.C-Δ-1:2-cyclohexenyl-ethyl-N. N'-dimethylbarbituric acid separates after the reaction is complete in a crystalline form. When obtained from benzene it melts at 146° C.

Instead of dimethylsulfate other alkylating agents can also be employed, if desired or required with the addition of catalysts.

Example 4

100 parts by weight of allylurea and 221 parts by weight of Δ-1:2-cyclohexenyl-ethyl-cyanoacetic acid are added to a solution of 46 parts by weight of sodium in 1000 parts by weight of absolute alcohol and heating is effected under reflux for 6 hours. After cooling the reaction mass is neutralized with dilute acetic acid and the alcohol distilled off. The residue is triturated with water, filtered with strong suction and then boiled under reflux for 4 hours with 4 times its weight of 30% sulfuric acid. The C. C-Δ-1:2-cyclohexenyl-ethyl-N-allylbarbituric acid, which separates, is filtered by suction, washed until neutral and crystallized from alcohol. Colorless needles, melting at 84° C., are obtained.

Example 5

40 parts by weight of monomethylurea and 46 parts by weight of the ethylester of Δ-1:2-cyclopentenyl-methylcyanoacetic acid are added to a solution of 12.5 parts by weight of sodium in 270 parts by weight of absolute alcohol and heated to boiling under reflux for 6 hours. The alcohol is then removed by distillation in vacuo and the residue heated under reflux for 8 hours with 25% sulfuric acid. After cooling the reaction mass is extracted with ether. The resulting extract is shaken with normal caustic soda lye, the new compound is precipitated from the alkaline solution by means of acid. When obtained from alcohol and then again dissolved in benzene and precipitated by means of petroleum ether it melts at 119° C.

We claim:

1. N-alkylated derivatives of the barbituric acid series of the general formula:

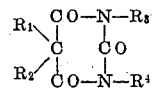

wherein $R_1$ is a cyclo-alkenyl group, $R_2$ and $R_3$ are alkyl or alkenyl radicals, $R_4$ is hydrogen, alkyl, alkenyl or metal selected from the group consisting of alkali- and alkaline earth metals, which barbituric acid derivatives are generally whitish crystalline products, soluble in hot alcohol, being soluble with difficulty in cold water, and the products wherein only one nitrogen atom is alkylated form salts and are therefore easily soluble in dilute caustic soda lye.

2. N-alkylated derivatives of the barbituric acid series of the general formula:

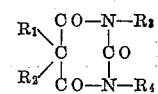

wherein $R_1$ is a cyclohexenyl radical, $R_2$ and $R_3$ are alkyl or alkenyl radicals, $R_4$ is hydrogen, alkyl, alkenyl or a metal selected from the group consisting of alkali- and alkaline earth metals, which barbituric acid derivatives are generally whitish crystalline products soluble in hot alcohol, being soluble with difficulty in cold water, and the products wherein only one nitrogen atom is alkylated form salts and are therefore easily soluble in dilute caustic soda lye.

3. N-alkylated derivatives of the barbituric acid series of the general formula:

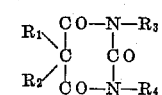

wherein $R_1$ is a cyclopentenyl radical, $R_2$ and $R_3$ are alkyl or alkenyl radicals $R_4$ is hydrogen, alkyl alkenyl or a metal selected from the group consisting of alkali- and alkaline earth metals, which barbituric acid derivatives are generally whitish crystalline products, soluble in hot alcohol, being soluble with difficulty in cold water, and the products wherein only one nitrogen atom is alkylated form salts and are therefore easily soluble in dilute caustic soda lye.

4. N-alkylated derivatives of the barbituric acid series of the general formula:

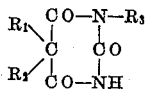

wherein $R_1$ is a cyclohexenyl radical, $R_2$ and $R_3$ are alkyl or alkenyl radicals, which barbituric acid derivatives are generally whitish crystalline products soluble in hot alcohol, being soluble with difficulty in cold water, forming salts and are therefore easily soluble in dilute caustic soda lye.

5. N-alkylated derivatives of the barbituric acid series of the general formula:

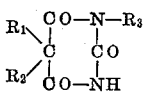

wherein $R_1$ is a cyclohexenyl radical, $R_2$ and $R_3$ stand for alkyl, which barbituric acid derivatives are generally whitish crystalline products soluble in hot alcohol, being soluble with difficulty in cold water, forming salts and are easily soluble in dilute caustic soda lye.

6. N-methyl-Δ-1:2-cyclohexenyl-methyl barbituric acid of the formula:

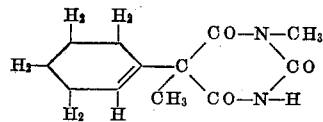

crystallizing from acetic acid ester in crystals melting at 146° C., soluble in hot alcohol, being soluble with difficulty in cold water, and forming easily soluble salts with sodium and lithium.

7. The sodium salt of N-methyl Δ-1:2-cyclohexenylmethyl barbituric acid of the formula:

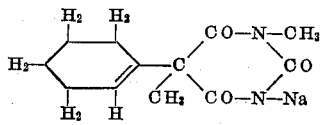

being soluble in water and in alcohol, and retaining the valuable properties of the free acid.

WALTER KROPP.
LUDWIG TAUB.